UNITED STATES PATENT OFFICE.

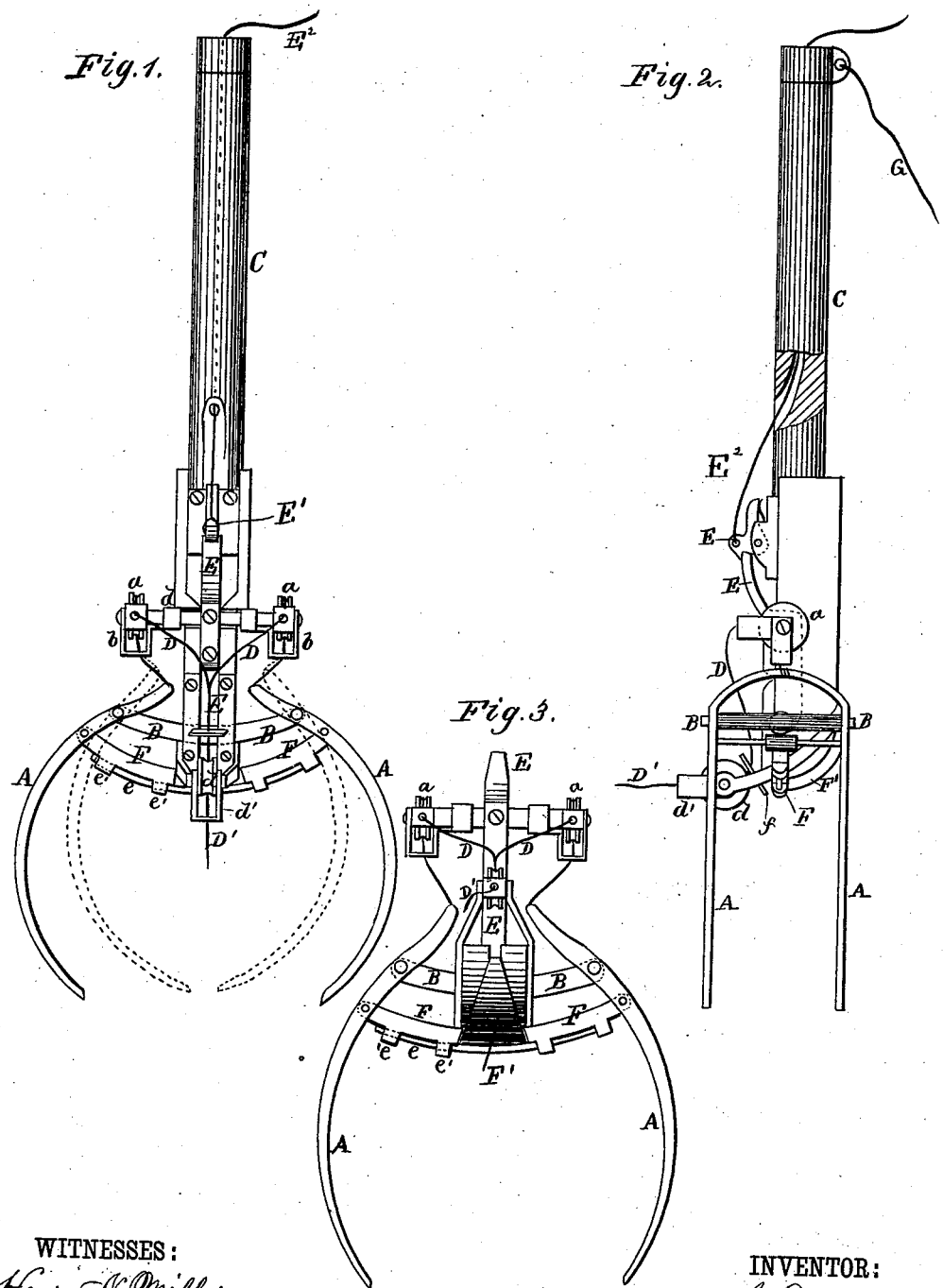

ARMONDOS FRANK, OF HOWELL, MICHIGAN.

IMPROVEMENT IN HORSE HAY-FORKS.

Specification forming part of Letters Patent No. 207,863, dated September 10, 1878; application filed June 5, 1878.

*To all whom it may concern:*

Be it known that I, ARMONDOS FRANK, of Howell, in the county of Livingston and State of Michigan, have invented a new and Improved Hay-Fork, of which the following is a specification:

In the accompanying drawing, Figure 1 represents a front elevation of my improved hay-fork; Fig. 2, a side elevation, partly in section; and Fig. 3, an end view of the same, shown in tilted position, and with open tines for dropping the load.

Similar letters of reference indicate corresponding parts.

The object of this invention is to furnish an improved hay-fork that takes up the load of hay or grain with great facility, and retains the same during the time that the fork is traveling to the point where the load is to be deposited, the tines being then opened in convenient manner and the fork returned to the place of charging; and the invention consists of a hay-fork with fulcrumed tines, that are closed to take up the load by the action of the main rope, to which the horse is hitched, and then locked to the handle or stock by a spring-catch that is released by a rope passing through the hollow handle or stock, so as to drop the load by the tilting and the spreading of the tines. The spreading is accomplished by the weight of the load and lateral connecting-arms of the swinging tines, which arms pass along a wedge-shaped guide-portion at the end of the handle.

Referring to the drawing, A represents the fulcrumed tine-sections of my improved hay-fork, which swing on a double T-shaped cross-piece, B, said cross-piece swinging again in bearings at the end of the handle or stock C of the fork.

The fulcrumed tine-sections of the hay-fork are provided with two or more curved tines, which are united above their fulcra on the cross-piece B, and connected by means of ropes D, passing over pulleys $a$ and through perforations of loosely-swinging retaining-staples $b$ at the end of lateral arms $d$ of a center-piece, E, which extends at right angles from the double T-shaped cross-piece B, and is locked into a recess of the handle C by means of a fulcrumed spring-catch, E¹, which engages the end of the center-piece. The connecting-ropes of the tine-sections are united in front of the handle and attached to the main rope D', which is conducted over a third pulley, $d$, and a swinging perforated staple, $d'$, at the front part of the handle, the pulley being supported in a fixed bracket-frame secured to the end of the handle C.

The team is hitched to the main rope in the usual manner, so that by pulling on the same and holding the handle in upward direction the tines will close and take up and hold the hay or grain. The tine-sections are further connected, by swinging sliding sections F, below the double T-shaped cross-piece B, the sections F being pivoted to cross-rods of the tines, and connected by a curved guide-rod, $e$, which is attached permanently to one of the sections F and guided in sleeves or staples $e'$ of the other section F. The ends of these connecting-sections F are engaged by a wedge-shaped quadrantal guide-piece, F', at the end of the handle C as soon as the catch-piece is released from the center rod, and the hay-fork allowed to tilt into a position at right angles to its former position on the handle, thereby forcing open the prongs.

To the main rope is attached loosely, back of the lower front pulley, $d$, a short cross-piece, $f$, that serves to catch on the pulley and hold the heft of the fork till the fork is tilted and the tines are opened. The hay-fork is returned by a rope, G, attached to the opposite end of the handle, to the place where it is charged with hay, while a third rope, E², passes from the catch-piece through the center perforation of the handle, these two ropes being of sufficient length to reach from the point where the fork is to be charged to the farthest point where the hay is to be deposited in the barn.

When the fork is to be charged the handle is held in upward position and the team then started, so that the main rope will close the teeth and take up a load of hay or grain from the wagon. The fork is then raised and carried forward by the team, the handle assuming then a downward position, in which it is held until it arrives at the place where the load is to be dropped. The catch-piece is then released from the center-piece by pulling its rope, and thereby the fork released and tilted by the weight of its load on the end of the handle, the tines being simultaneously opened and the load dropped. The hay-fork is then returned by the rope attached to the opposite handle end and then charged again with hay, as before described, the center-piece of the tilting fork being, however, first locked onto the catch-piece before the tines are closed, and the fork is started again on its way to the point of deposit.

Having thus described my invention, I claim as new and desire to secure by Letters Patent—

1. The combination, in a hay-fork, of a handle having a spring-acted catch-piece and wedge-shaped quadrantal guide portion at the end with swinging and tilting fork-sections, having laterally connecting and guided sections for opening the fork, substantially as and for the purpose set forth.

2. In a hay-fork, the combination of the handle having a locking catch-piece, and of the laterally-connected and tilting fork-sections, with guide-pulleys and closing-ropes passing from the fork-sections over the pulleys and being connected to the main rope of the hay-fork, substantially as and for the purpose set forth.

3. The combination of the fulcrumed and tilting fork-sections, having a center-piece extending from the lateral cross-piece, with a spring catch-piece and operating-rope passing through the perforated handle for tilting the fork, substantially as set forth.

4. The combination of the swinging and tilting fork-sections, that are locked in closed position to the handle, with guide-pulleys for the branch and main ropes, and with a sliding cross-piece placed on main rope back of front pulley to take up heft of fork in forward motion to point of discharge, substantially as set forth.

ARMONDOS FRANK.

Witnesses:
FRANK Z. HUBBELL,
HENRY WARNER.